(12) United States Patent
Bergkvist, Jr. et al.

(10) Patent No.: US 8,989,313 B2
(45) Date of Patent: Mar. 24, 2015

(54) ADAPTABLE RECEIVER DETECTION

(71) Applicant: International Business Machines Corporation, Armonk, NY (US)

(72) Inventors: John J. Bergkvist, Jr., Williston, VT (US); Steven M. Clements, Raleigh, NC (US); Carrie E. Cox, Apex, NC (US); Hayden C. Cranford, Jr., Cary, NC (US); Todd E. Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/792,281

(22) Filed: Mar. 11, 2013

(65) Prior Publication Data

US 2014/0254650 A1    Sep. 11, 2014

(51) Int. Cl.
*H04B 17/00* (2006.01)
(52) U.S. Cl.
CPC .................................. *H04B 17/0037* (2013.01)
USPC .......................................................... 375/317
(58) Field of Classification Search
CPC ........... H04B 17/0012; H04B 17/0022; H04B 17/003; H04B 17/0037; H04B 17/0042; H04B 17/0062; H04B 17/0047
USPC ................................... 375/295, 296, 316, 317
See application file for complete search history.

(56) References Cited

U.S. PATENT DOCUMENTS

| | | | |
|---|---|---|---|
| 6,346,910 B1 * | 2/2002 | Ito | 342/174 |
| 6,825,693 B2 | 11/2004 | Schoenborn et al. | |
| 7,222,290 B2 | 5/2007 | Guo et al. | |
| 7,231,480 B2 | 6/2007 | Woodral | |
| 7,945,226 B2 * | 5/2011 | Mak | 455/232.1 |

* cited by examiner

*Primary Examiner* — Kevin Kim
(74) *Attorney, Agent, or Firm* — Edward J. Lenart; H. Daniel Schnurmann; Biggers Kennedy Lenart Spraggins LLP

(57) ABSTRACT

Methods and apparatuses for adaptable receiver detection are provided. Embodiments include providing, by receiver detection circuitry at a transmitter coupled to a communication link, a voltage to the communication link; determining, by the receiver detection circuitry, a rise time corresponding to a rising edge change of the voltage on the communication link; determining, by the receiver detection circuitry, a fall time corresponding to a falling edge change of the voltage on the communication link; and determining, by the receiver detection circuitry, whether the rise time and the fall time are consistent with the transmitter being coupled through the communication link to a remote receiver.

18 Claims, 9 Drawing Sheets

US 8,989,313 B2

ADAPTABLE RECEIVER DETECTION

BACKGROUND OF THE INVENTION

1. Field of the Invention

The field of the invention is data processing, or, more specifically, methods and apparatuses for adaptable receiver detection.

2. Description of Related Art

A transmitter may support a receiver detection function that allows the transmitter to determine whether there is a remote receiver present at the far end of a communication link. The transmitter may use the result of this determination in a variety of ways. For example, one of the transmitter's communication protocols may require the transmitter to confirm the presence of a remote receiver before attempting communication with the remote receiver. As another example, the transmitter may need to determine whether a receiver is present as part of confirming that a communication link is operating properly. Because the transmitter relies on the results of the determination to perform other operations, the accuracy of the determination of whether a receiver is present may impact the overall efficiency and operation of the transmitter.

SUMMARY

Methods for adaptable receiver detection are provided. Embodiments include providing, by receiver detection circuitry at a transmitter coupled to a communication link, a voltage to the communication link; determining, by the receiver detection circuitry, a rise time corresponding to a rising edge change of the voltage on the communication link; determining, by the receiver detection circuitry, a fall time corresponding to a falling edge change of the voltage on the communication link; and determining, by the receiver detection circuitry, whether the rise time and the fall time are consistent with the transmitter being coupled through the communication link to a remote receiver.

Apparatuses for adaptable receiver detection are provided. Embodiments include receiver detection circuitry at a transmitter coupled to a communication link, the receiver detection circuitry configured to: provide a voltage to the communication link; determine a rise time corresponding to a rising edge change of the voltage on the communication link; determine a fall time corresponding to a falling edge change of the voltage on the communication link; and determine whether the rise time and the fall time are consistent with the transmitter being coupled through the communication link to a remote receiver.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
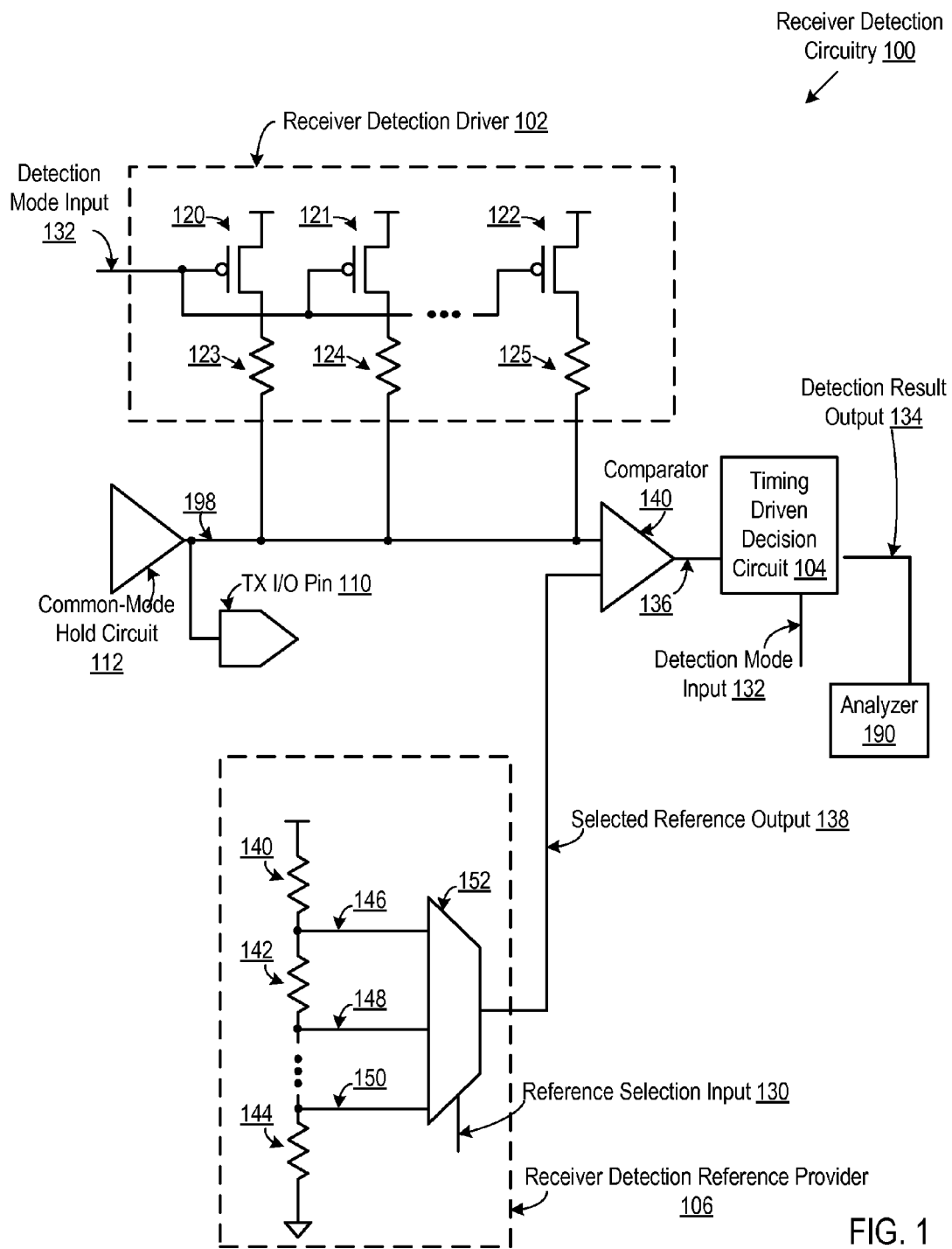
FIG. 1 sets forth an example of an apparatus that includes receiver detection circuitry for adaptable receiver detection according to embodiments of the present invention.

Exemplary methods and apparatuses for adaptable receiver detection in accordance with the present invention are described with reference to the accompanying drawings, beginning with FIG. 1. FIG. 1 sets forth an example of an apparatus that includes receiver detection circuitry (100) for adaptable receiver detection according to embodiments of the present invention. The receiver detection circuitry (100) is configured to determine at a transmitter whether a remote receiver is present on a communication link. Specifically, the receiver detection circuitry (100) is configured to provide a voltage to a communication link (198); determine a rise time corresponding to a rising edge change of the voltage on the communication link (198); determine a fall time corresponding to a falling edge change of the voltage on the communication link (198); and determine whether the rise time and the fall time are consistent with the transmitter being coupled through the communication link to a remote receiver. That is, the receiver detection circuitry (100) utilizes both rising edge detection and falling edge detection to determine whether voltage changes on a communication link indicate that a receiver is present.

In the example of FIG. 1, the communication link (198) is used to couple a transmitter and a receiver (not shown). A transmission I/O pin (110) is used in the example of FIG. 1 to connect the communication link (198) to a transmitter and a receiver (not shown). A communication link may include cables, backplanes, device interconnection pathways, such as a Peripheral Component Interconnect (PCI) bus, and other types of types of transmission lines as would occur to one of skill in the art.

The receiver detection circuitry (100) of FIG. 1 includes a common-mode hold circuit (112) configured to provide a voltage to the communication link (198). Providing the voltage to the communication link (198) may include holding the voltage on the communication link at a particular voltage level. For example, some device protocols, such as the PCI Express standard, require the transmission output to be held at a particular voltage level in electrical idle, which may be considered the start state for receiver detection. That is, the common-mode hold circuit (112) may be used to establish a starting voltage level so that a receiver detection function may be performed.

The receiver detection circuitry (100) of FIG. 1 also includes a receiver detection driver (102) to drive the voltage on the communication link (198) either to a higher level or a lower level as part of the receiver detection function. The receiver detection driver (102) is configured to drive the voltage higher during a rising edge detection and to drive the voltage lower during a falling edge detection. In the example of FIG. 1, the receiver detection driver (102) includes three transistors (120, 121, 122) coupled to three resistors (123, 124, 125). According to embodiments of the present invention, any number of transistors and receivers may be used to implement a receiver detection driver. That is, the receiver detection driver (102) is programmable and may be configured to provide a variable output resistance allowing for a variable drive strength. Varying the drive strength of the receiver detection driver (102) changes the impedance difference between the transmitter and the receiver, thus allowing for varying the rise time of the voltage of the communication link.

In the example of FIG. 1, the receiver detection driver (102) includes a combination of transistors (120, 121, 122) and resistors (123, 124, 125). However, according to embodiments of the present invention, the receiver detection driver (102) can be comprised of any type of circuitry that is capable of driving the voltage on the communication link (198), such as a current mode circuit.

In the example of FIG. 1, each of the transistors (120, 121, 122) is coupled to a detection mode input (132). The polarity of the detection mode input (132) controls whether the transistors are 'on' or 'off'. In the example of FIG. 1, when the transistors are 'on,' the receiver detection driver (102) has low output impedance relative to the common-mode hold circuit (112), which pulls the transmission output to a positive power supply and thus to a higher voltage level. Conversely, when the transistors are 'off,' the receiver detection driver (102) has high output impedance relative to the common-mode hold circuit (112), which pulls the transmission output to a lower voltage level. In a particular embodiment, the receiver detection driver (102) is configured to pull the voltage on the communication link to ground. Driving the voltage on the communication link higher or lower may be considered the start of the receiver detection function. That is, changing the state of the transistors in the receiver detection driver (102) may cause the voltage level on the communication link to change. As will be explained below, the rate of change in the voltage is used to indicate whether a receiver is present on the communication link.

The receiver detection circuitry (100) of FIG. 1 also includes a receiver detection reference provider (106) having a multiplexer (152). The multiplexer (152) is configured to select a selected reference output (138) from voltages (146, 148, 150) generated over a plurality of resistors (140, 142, 144) in response to a reference selection input (130). That is, the receiver detection reference provider (106) is programmable and may be configured to provide any number of reference voltages as the selected reference output (138).

In the example of FIG. 1, the receiver detection circuitry (100) also includes a comparator (140) configured to compare the voltage level on the communication link (198) to the selected reference output (138) and generate an output (136) indicating the results of the comparison. For example, the output (136) may indicate that the voltage on the communication link is greater or lesser than the selected reference output (138).

The receiver detection circuitry (100) of FIG. 1 also includes a timing driven decision circuit (104) configured to receive the output (138) of the comparator (140) to determine a rise time corresponding to a rising edge change of the voltage on the communication link (198). The timing driven decision circuit (104) in the example of FIG. 1 is responsive to a detection mode input (132). As explained above, the detection mode input (132) indicates to the receiver detection circuitry (100) whether a rising edge detection or a falling edge detection is being performed. That is, the timing driven decision circuit (104) is a circuitry capable of making decisions based on the timing of the comparator circuit, such as detecting time on different edges of the voltage change on the communication link. A rise time indicates a length of time for the voltage on the communication link to rise from a starting level, such as a common-mode voltage, to above a reference voltage level. The timing driven decision circuit (104) is also configured to determine a fall time corresponding to a falling edge change of the voltage on the communication link (198). A fall time indicates a length of time for the voltage on the communication link to fall from a relatively high level, such as a positive power supply level, to a normal operating common-mode voltage level.

The timing driven decision circuit (104) is also configured to determine whether the rise time and the fall time are consistent with the transmitter being coupled through the communication link (198) to a remote receiver. The time delta between enabling the receiver detection function (i.e., pulling the voltage on the communication link to either a higher voltage level or a lower voltage level) to the transition of the comparator (i.e., voltage on the communication link either rose above or fell below the reference voltage level) indicates if the transmitter load is low or high impedance. The timing driven decision circuit (104) may be configured to compare the rise time and the fall time to timer values associated with a particular receiver impedance. That is, if a receiver is present, the rise time and the fall time should correspond to the timer values. The timing driven decision circuit (104) may be considered programmable in that different timer values may be selected and used to correspond to the measured rise time and the measured fall time. Based on the comparison of the rise time and the fall time to the timer values, the timing driven decision circuit (104) generates a detection result output (134). In a particular embodiment, the detection result output (134) is an output flag indicating whether a receiver is present. In this example, the detection result output (134) may be a binary value of one to indicate that a receiver is present or a binary value of zero to indicate that a receiver is not present. For example, in the case of an absent or unpowered receiver, the channel common-mode impedance may be high, and the common-mode voltage at the transmitter output may change quickly. As another example, if a powered receiver is present, the channel common-mode impedance may be low due to the system's insertion of a large common mode capacitor on the communication link.

According to embodiments of the present invention, the programmable features of the receiver detection circuitry (100) of FIG. 1 can be used together to analyze whether the receiver is present and to determine whether the communication link is experiencing a particular type of fault. For example, the receiver detection circuitry can 'loop' through the programmable receiver detection parameters of the receiver detection circuitry, such as varying receiver detection driver strength, varying reference voltage level used for selected reference output (138) of the receiver detection reference provider (106), and varying the timer values used in the timing driven decision circuit (104).

The detection result output (134) may optionally be provided to an analyzer (190) to analyze the results generated by the timing driven decision circuit (104). That is, the analyzer (190) may be used to record the different results; compare the results; and use the comparison of the results to determine whether a receiver is present or whether the communication link is experience a fault, such as a hard fault or a soft fault. By generating receiver detection results based on a variety of programmable receiver detection parameters, the receiver detection circuitry (100) of FIG. 1 is adaptable to a variety of receiver detection circumstances and is thus suited for adaptable receiver detection.

Figure 2:
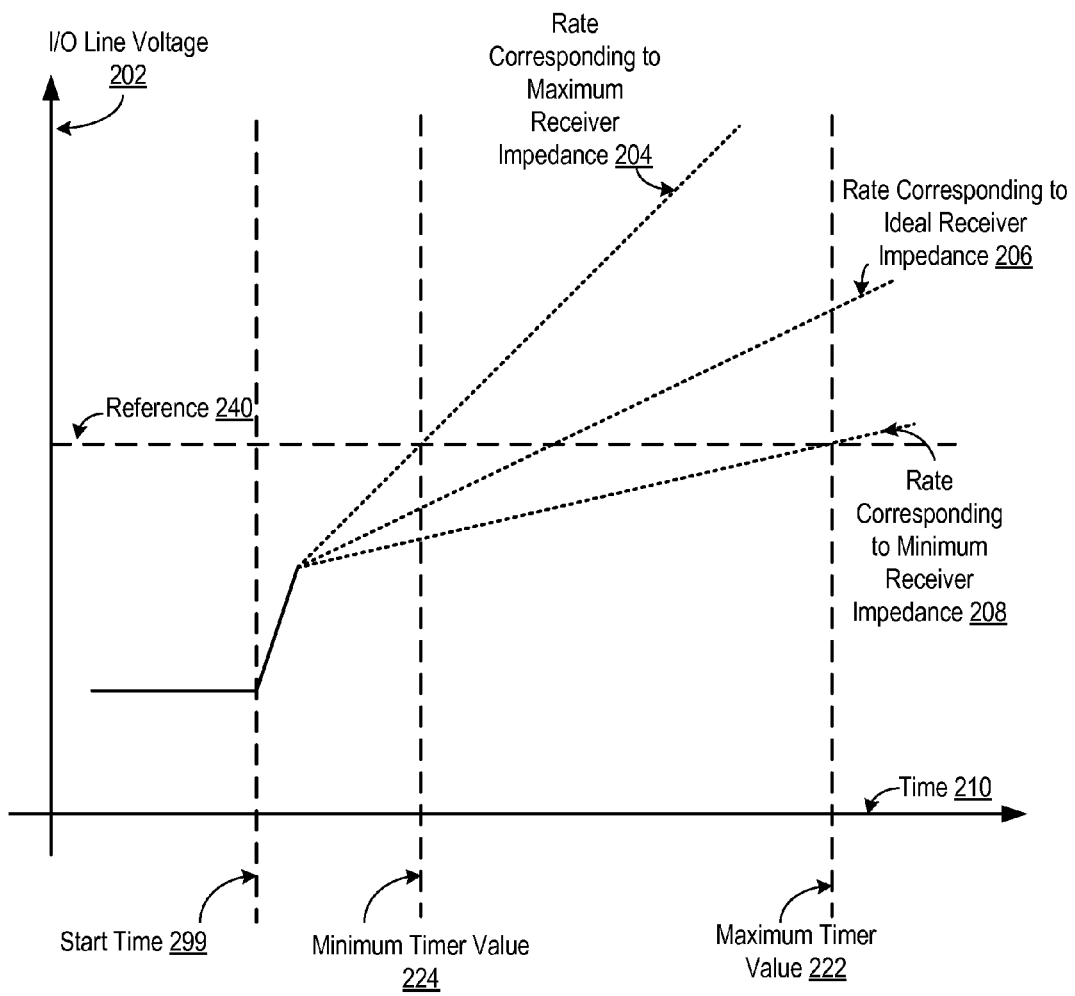
FIG. 2 sets forth an example of a chart illustrating adaptable receiver according to embodiments of the present invention.

FIG. 2 sets forth an example of an illustration of voltage change rates using receiver detection circuitry of an adaptable receiver detection apparatus according to embodiments of the present invention. In the example of FIG. 2, an I/O line voltage (202) of a communication link is measured over time (200). Beginning at a start time (299), the adaptable receiver detection function starts and a receiver detection driver pulls the voltage of the communication link towards a positive power supply. A timing driven decision circuit may be used to track at what time (i.e., a rise time) the voltage of the communication link rises above a reference voltage (240).

FIG. 2 illustrates three voltage rates. A first rate (204) corresponds to a maximum receiver impedance. The first rate (204) is characterized by having a voltage that is above the reference voltage level (290) at a minimum timer value (224). A second rate (208) corresponds to a minimum receiver impedance. The second rate (208) is characterized by having a voltage that is above the reference voltage level (290) at a minimum timer value (222). A third rate (206) is characterized by having a voltage above the reference voltage level (290) somewhere between a minimum timer value (224) and a maximum timer value (222). In the example of FIG. 2, a timing driven decision circuit may determine that rise times (i.e., the time for the voltage of the communication link to rise above a reference voltage level) that are less than the minimum timer value or above the maximum timer value do not correspond to voltage change rates of a properly connected receiver. That is, the timing driven decision circuit may generate a result that indicates that a receiver is not present. Likewise, a timing driven decision circuit may determine that rise times (i.e., the time for the voltage of the communication link to rise above a reference voltage level) that are greater than the minimum timer value and less than the maximum timer value correspond to voltage change rates of a properly connected receiver. Under these circumstances, a timing driven decision circuit may generate a result that indicates that a receiver is present.

Figure 3:
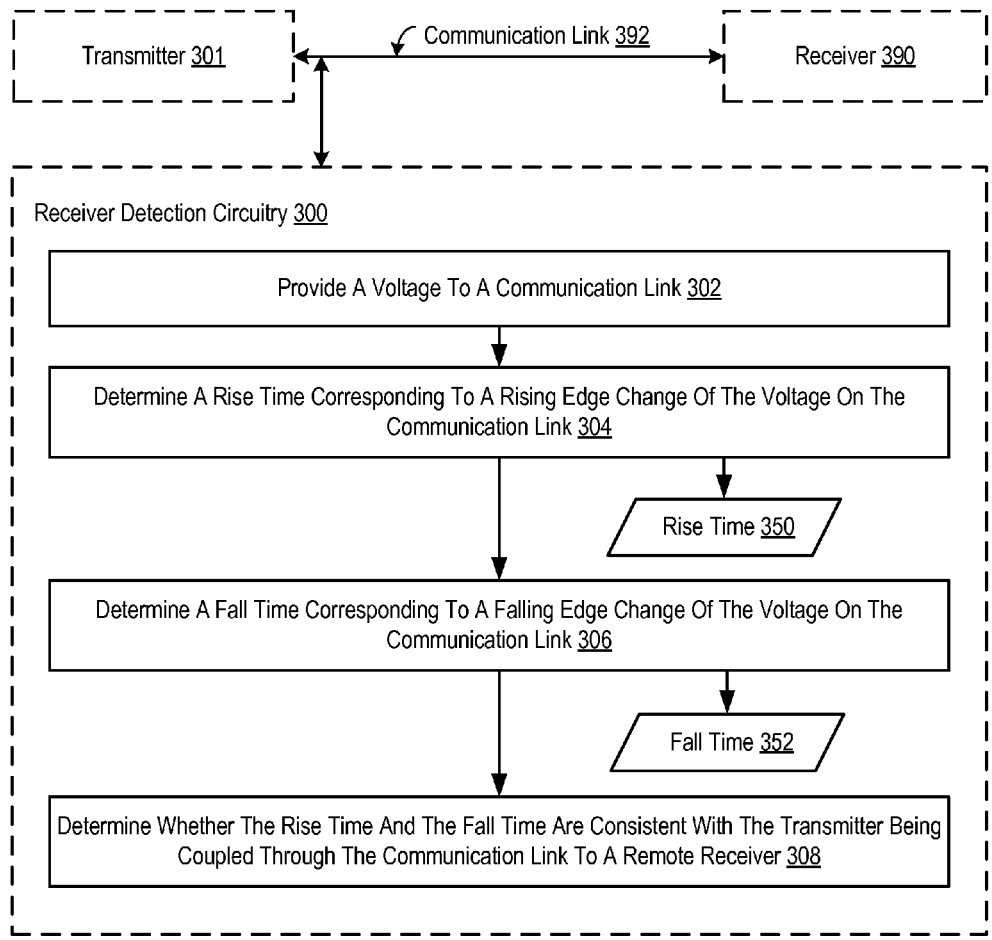
FIG. 3 sets forth a flow chart illustrating an example of a method for adaptable receiver detection according to embodiments of the present invention.

FIG. 3 sets forth a flow chart illustrating an example of a method for adaptable receiver detection according to embodiments of the present invention. The method of FIG. 3 includes providing (302), by receiver detection circuitry (300) at a transmitter (301) coupled to a communication link (392), a voltage to the communication link (392). A communication link may include cables, backplanes, device interconnection pathways, such as a Peripheral Component Interconnect (PCI) bus, and other types of types of transmission lines as would occur to one of skill in the art. Providing (302), by receiver detection circuitry (300) at a transmitter (301) coupled to a communication link (392), a voltage to the communication link (392) may be carried out by holding the voltage on the communication link at a particular voltage level. For example, some device protocols, such as the PCI Express standard require the transmission output to be held at a particular voltage level in electrical idle, the start state for receiver detection. The receiver detection circuitry may utilize a common-mode hold circuit (112) to hold the voltage at a particular common-mode voltage level to establish a starting voltage level before a receiver detection function is performed.

The method of FIG. 3 also includes determining (304), by the receiver detection circuitry (300), a rise time (350) corresponding to a rising edge change of the voltage on the communication link (392). A rise time indicates a length of time for the voltage on the communication link to rise from a starting level, such as a common-mode voltage, to above a reference voltage level. Determining (304), by the receiver detection circuitry (300), a rise time (350) corresponding to a rising edge change of the voltage on the communication link (392) may be carried out by comparing a rise time to a timer value of a timing driven decision circuit. A timer value may be selected to correspond to a time for a voltage change to occur if a particular receiver impedance is connected to the communication link.

The method of FIG. 3 also includes determining (306), by the receiver detection circuitry (300), a fall time (352) corresponding to a falling edge change of the voltage on the communication link (392). A fall time indicates a length of time for the voltage on the communication link to fall from a relatively high level, such as a positive power supply level, to a normal operating common-mode voltage level.

Determining (306), by the receiver detection circuitry (300), a fall time (352) corresponding to a falling edge change of the voltage on the communication link (392) may be carried out by comparing a rise time to a timer value of a timing driven decision circuit.

The method of FIG. 3 also includes determining (308), by the receiver detection circuitry (300), whether the rise time (350) and the fall time (352) are consistent with the transmitter (301) being coupled through the communication link (392) to a remote receiver (390). Determining (308), by the receiver detection circuitry (300), whether the rise time (350) and the fall time (352) are consistent with the transmitter (301) being coupled through the communication link (392) to a remote receiver (390) may be carried out by compare the rise time and the fall time to timer values associated with a particular receiver impedance. That is, if a receiver is present, the rise time and the fall time should correspond to the timer values. For example, a timing decision driven circuit may determine if the rise time is between a minimum timer value corresponding to a maximum receiver impedance and a maximum timer value corresponding to a minimum receiver impedance.

Figure 4:
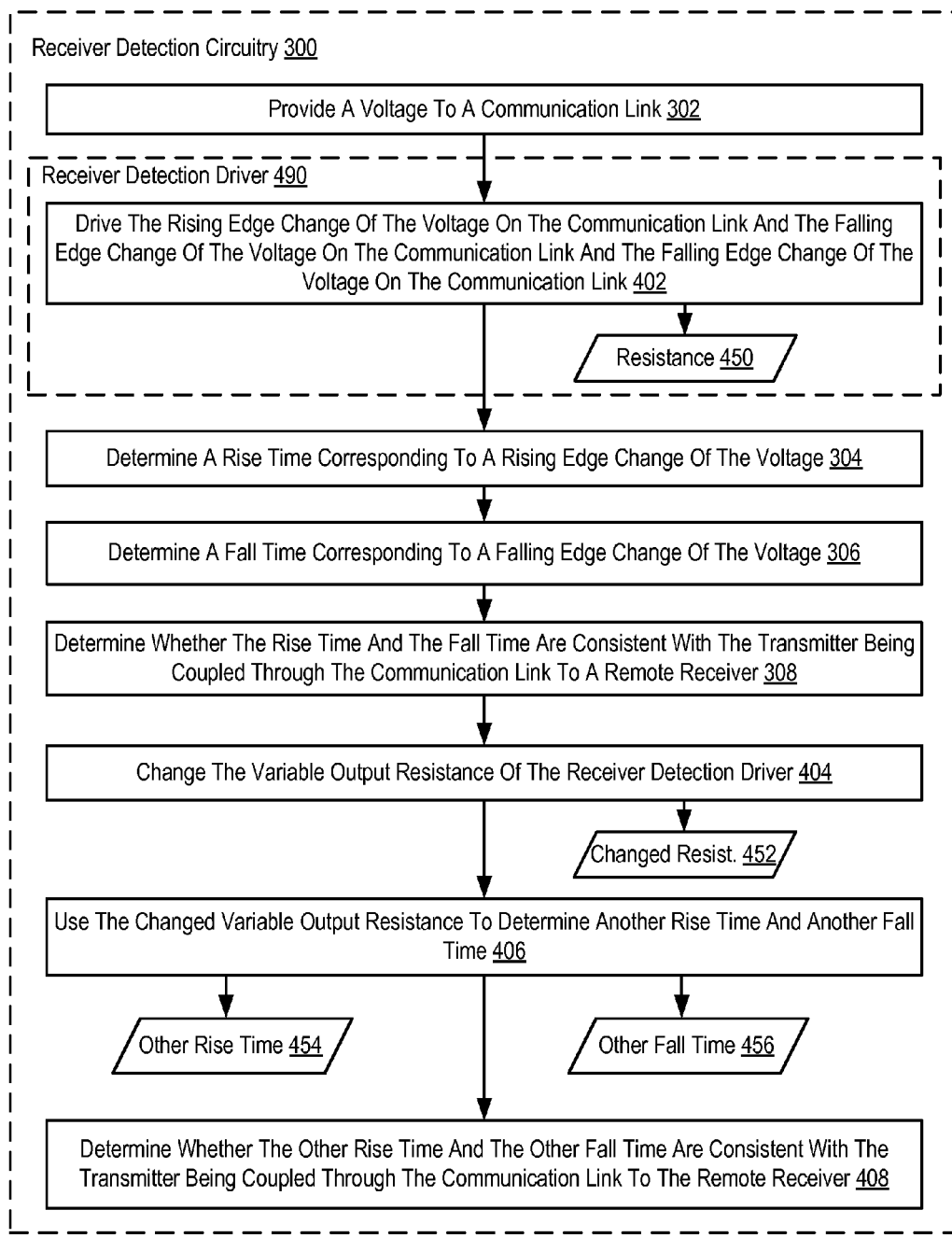
FIG. 4 sets forth a flow chart illustrating another example of a method for adaptable receiver detection according to embodiments of the present invention.

FIG. 4 sets forth a flow chart illustrating another example of a method for adaptable receiver detection according to embodiments of the present invention. The method of FIG. 4 is similar to the method of FIG. 3 in that the method of FIG. 4 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

The method of FIG. 4, however, includes driving (402), by a receiver detection driver (490) having a variable output resistance (450), the rising edge change of the voltage on the communication link (392) and the falling edge change of the voltage on the communication link (392). Driving (402) the rising edge change of the voltage on the communication link (392) and the falling edge change of the voltage on the communication link (392) may be carried out by driving the voltage higher during a rising edge detection and driving the voltage lower during a falling edge detection. For example, during rising edge detection, the receiver detection driver may generate a low output impedance relative to a common-mode hold circuit, which pulls the transmission output to a positive power supply and thus to a higher voltage level. Conversely, during falling edge detection, the receiver detection driver may generate a high output impedance relative to the common-mode hold circuit, which pulls the transmission output to a lower voltage level.

The method of FIG. 4 also includes changing (404) the variable output resistance (450) of the receiver detection driver (490). Changing (404) the variable output resistance (450) of the receiver detection driver (490) may be carried out by modifying one or more voltages applied to terminals of a transistor.

The method of FIG. 4 also includes using (406) the changed variable output resistance (452) to determine another rise time (454) and another fall time (456). Using (406) the changed variable output resistance (452) to determine another rise time (454) and another fall time (456) may be carried out by calculating a first length of time for a voltage change during a rising edge detection and another length of time for a voltage change during a falling edge detection.

The method of FIG. 4 also includes determining (408), by the receiver detection circuitry (300), whether the other rise time (454) and the other fall time (456) are consistent with the transmitter (301) being coupled through the communication link to the remote receiver (390). Determining (408), by the receiver detection circuitry (300), whether the other rise time (454) and the other fall time (456) are consistent with the transmitter (301) being coupled through the communication link to the remote receiver (390) may be carried out by comparing a rise time and a fall time to timer values of a timing driven decision circuit.

Figure 5:
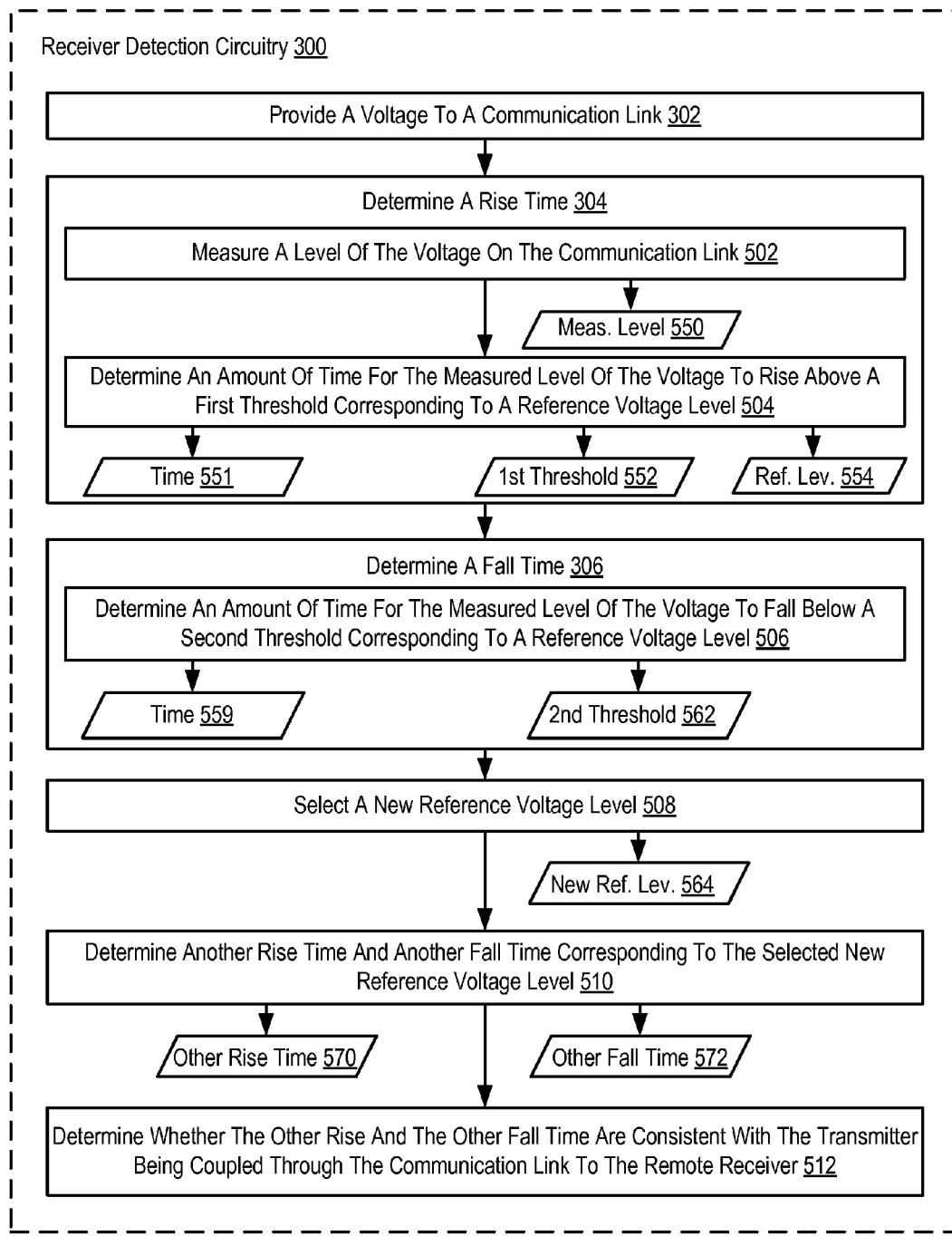
FIG. 5 sets forth a flow chart illustrating another example of a method for adaptable receiver detection according to embodiments of the present invention.

FIG. 5 sets forth a flow chart illustrating another example of a method for adaptable receiver detection according to embodiments of the present invention. The method of FIG. 5 is similar to the method of FIG. 3 in that the method of FIG. 5 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

In the method of FIG. 5, however, determining (304) a rise time (350) corresponding to a rising edge change of the voltage on the communication link (392) includes measuring (502) a level (550) of the voltage on the communication link (392). Measuring (502) a level (550) of the voltage on the communication link (392) may be carried out by using a comparator circuit to detect a level to the voltage present on the communication link.

In the method of FIG. 5, however, determining (304) a rise time (350) corresponding to a rising edge change of the voltage on the communication link (392) includes determining (504) an amount of time (551) for the measured level (550) of the voltage to rise above a first threshold (552) corresponding to a reference voltage level (554). Determining (504) an amount of time (551) for the measured level (550) of the voltage to rise above a first threshold (552) corresponding to a reference voltage level (554) may be carried out by starting a timing driven decision circuit at the beginning of a receiver detection function, such as activation of the receiver detection driver, or at some other defined point in the receiver detection function, and stopping the timing driven decision circuit in response to a state change at the output of the comparator circuit.

In the method of FIG. 5, however, determining (306) a fall time (352) corresponding to a falling edge change of the voltage on the communication link (392) includes determining (506) an amount (559) of time for the measured level (550) of the voltage to fall below a second threshold (562) corresponding to the reference voltage level (554). Determining (506) an amount (559) of time for the measured level (550) of the voltage to fall below a second threshold (562) corresponding to the reference voltage level (554) may be carried out by starting a timer at the beginning of a receiver detection function, such as activation of the receiver detection driver, or at some other defined point in the receiver detection function, and stopping the timing driven decision circuit in response to a state change at the output of the comparator circuit.

The method of FIG. 5 also includes selecting (508) a new reference voltage level (564). Receiver detection circuitry, according to embodiments of the present invention may include a receiver detection reference provider, which selects a selected reference output from a plurality of voltages in response to a reference selection input. Selecting (508) a new reference voltage level (564) may be carried out by changing the reference selection input at a receiver detection reference provider and outputting by the receiver detection reference provider, a different selected reference output.

The method of FIG. 5 also includes determining (510) another rise time (570) and another fall time (572) corresponding to the selected new reference voltage level (564). Determining (510) another rise time (570) and another fall time (572) corresponding to the selected new reference voltage level (564) may be carried out by calculating a first length of time for a voltage change during a rising edge detection and another length of time for a voltage change during a falling edge detection.

The method of FIG. 5 also includes determining (512), by the receiver detection circuitry (300), whether the other rise time (570) and the other fall time (572) are consistent with the transmitter (301) being coupled through the communication link (392) to the remote receiver (390). Determining (512) whether the other rise time (570) and the other fall time (572) are consistent with the transmitter (301) being coupled through the communication link (392) to the remote receiver (390) may be carried out by comparing a rise time and a fall time to timer values of a timing driven decision circuit.

Figure 6:
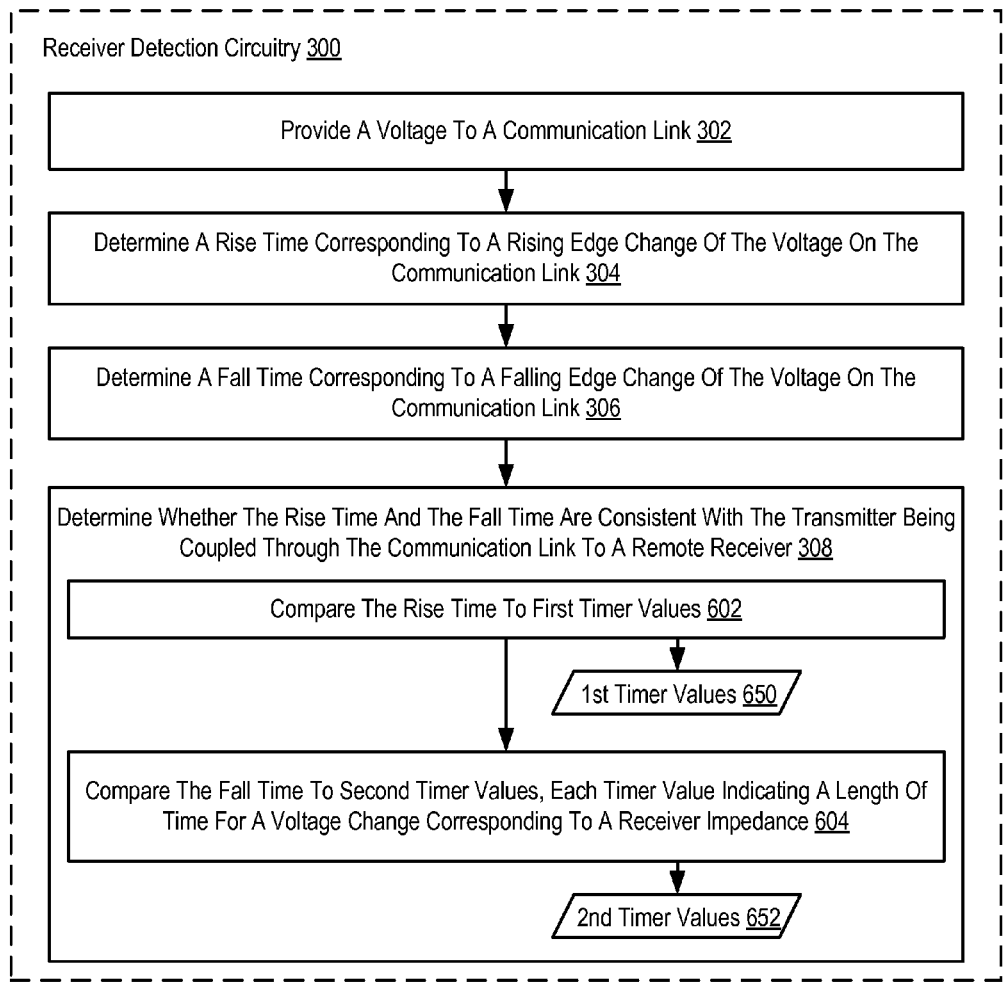
FIG. 6 sets forth a flow chart illustrating another example of a method for adaptable receiver detection according to embodiments of the present invention.

FIG. 6 sets forth a flow chart illustrating another example of a method for adaptable receiver detection according to embodiments of the present invention. The method of FIG. 6 is similar to the method of FIG. 3 in that the method of FIG. 6 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

In the method of FIG. 6, however, determining (308) whether the rise time (350) and the fall time (352) are consistent with the transmitter (301) being coupled through the communication link (392) to a remote receiver (390) includes comparing (602) the rise time (350) to first timer values (650). Comparing (602) the rise time (350) to first timer values (650)

may be carried out by determining whether the rise time is over a particular time, under a particular time, within a particular range of times, or some combination thereof.

In the method of FIG. 6, however, determining (308) whether the rise time (350) and the fall time (352) are consistent with the transmitter (301) being coupled through the communication link (392) to a remote receiver (390) includes comparing (604) the fall time (352) to second timer values (652). Each timer value indicates a length of time for a voltage change corresponding to a receiver impedance. Comparing (604) the fall time (352) to second timer values (652) may be carried out by determining whether the fall time is over a particular time, under a particular time, within a particular range of times, or some combination thereof.

Figure 7:
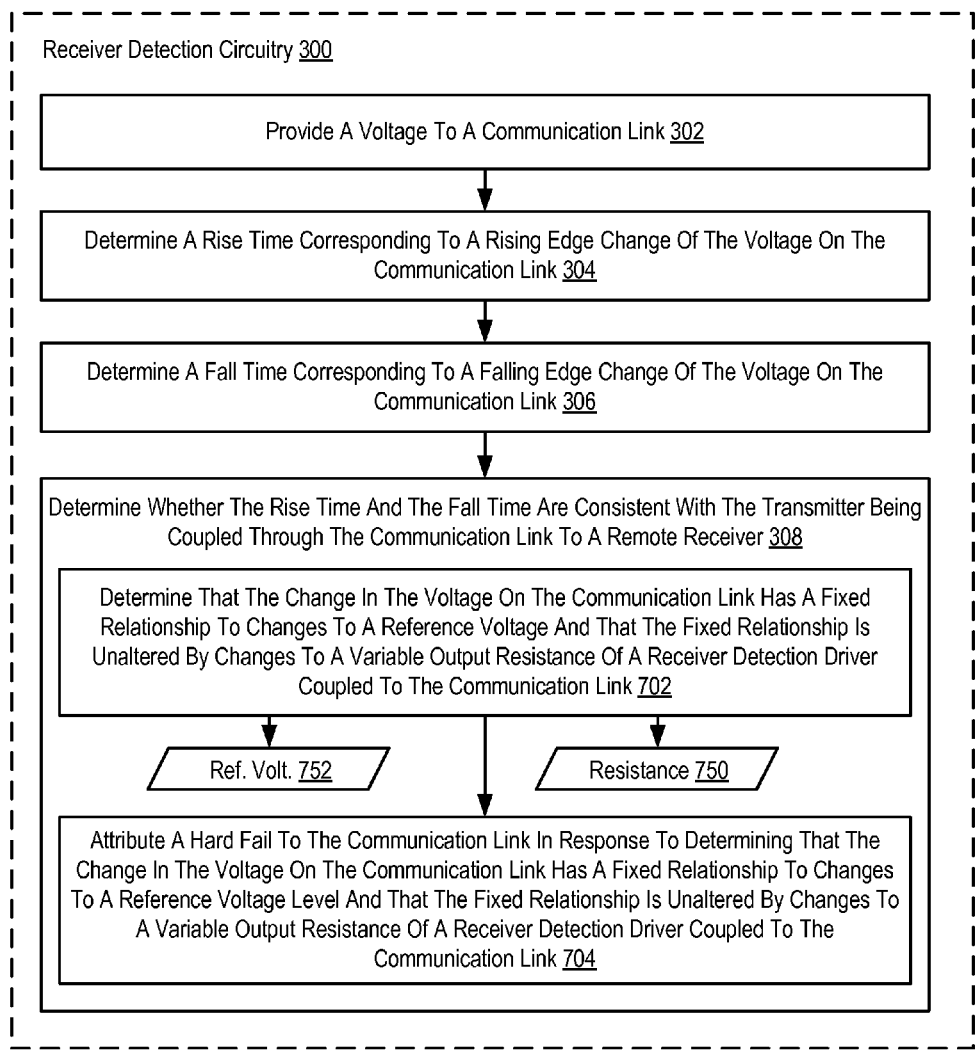
FIG. 7 sets forth a flow chart illustrating another example of a method for adaptable receiver detection according to embodiments of the present invention.

FIG. 7 sets forth a flow chart illustrating another example of a method for adaptable receiver detection according to embodiments of the present invention. The method of FIG. 7 is similar to the method of FIG. 3 in that the method of FIG. 7 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

In the method of FIG. 7, however, determining (308) whether the rise time (350) and the fall time (352) are consistent with the transmitter (301) being coupled through the communication link (392) to a remote receiver (390) includes determining (702) that the change in the voltage on the communication link (392) has a fixed relationship to changes to a reference voltage level (752) and that the fixed relationship is unaltered by changes to a variable output resistance (750) of a receiver detection driver (490) coupled to the communication link (392). Determining (702) that the change in the voltage on the communication link (392) has a fixed relationship to changes to a reference voltage level (752) and that the fixed relationship is unaltered by changes to a variable output resistance (750) of a receiver detection driver (490) coupled to the communication link (392) may be carried out by comparing a first comparison result based on a first reference voltage level to a second comparison result based on a second reference voltage level.

In the method of FIG. 7, however, determining (308) whether the rise time (350) and the fall time (352) are consistent with the transmitter (301) being coupled through the communication link (392) to a remote receiver (390) includes attributing (704) a hard fail to the communication link (392) in response to determining that the change in the voltage on the communication link (392) has a fixed relationship to changes to a reference voltage level (752) and that the fixed relationship is unaltered by changes to a variable output resistance (750) of a receiver detection driver (490) coupled to the communication link (392). A hard fail corresponds to a stuck-at-fault problem that occurs when a transmitter output cannot bet altered. Attributing (704) a hard fail to the communication link (392) in response to determining that the change in the voltage on the communication link (392) has a fixed relationship to changes to a reference voltage level (752) and that the fixed relationship is unaltered by changes to a variable output resistance (750) of a receiver detection driver (490) coupled to the communication link (392) may be carried out by storing, displaying, or providing a flag or some other type of indicator that is associated with a hard fail assignment.

Figure 8:
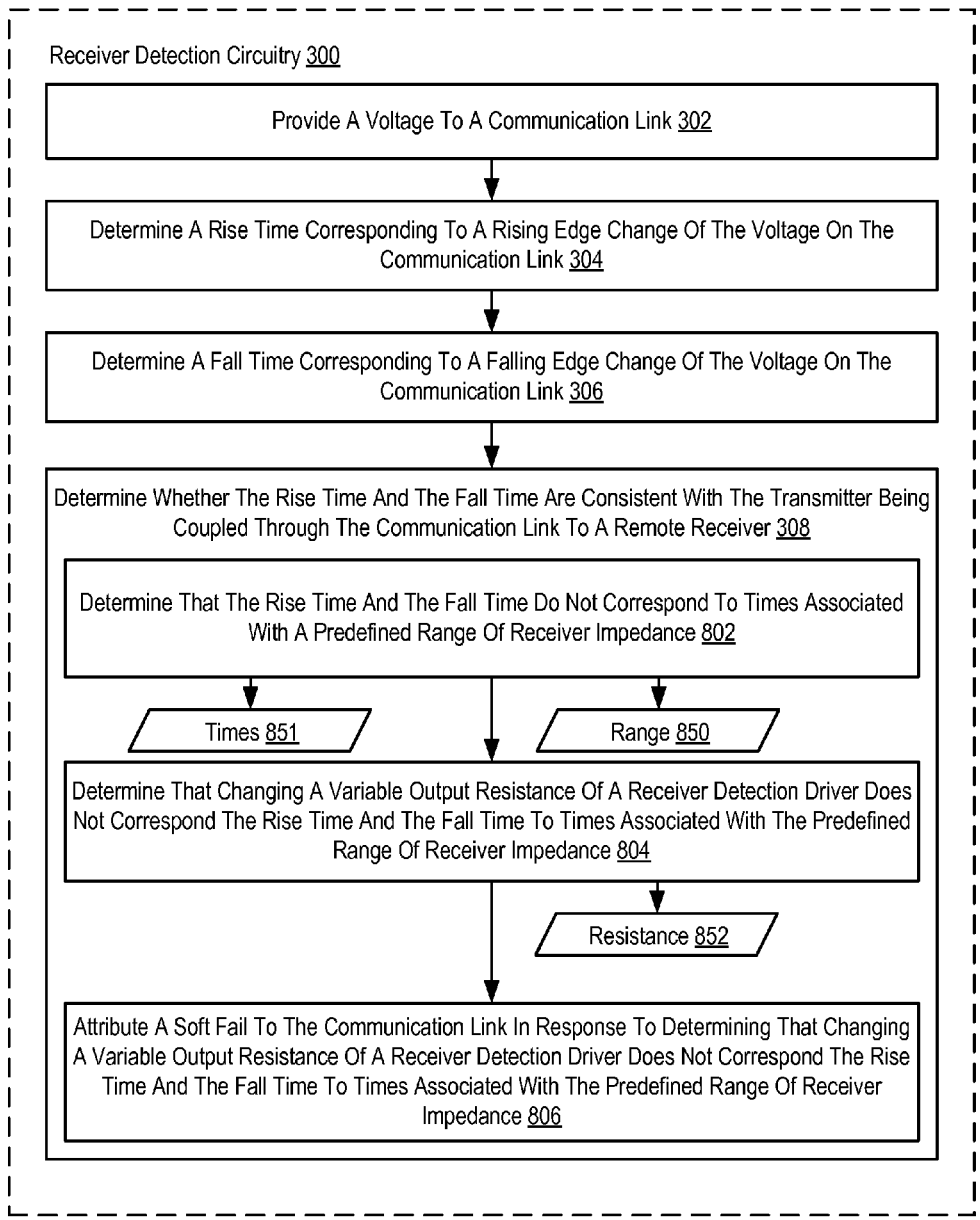
FIG. 8 sets forth a flow chart illustrating another example of a method for adaptable receiver detection according to embodiments of the present invention.

FIG. 8 sets forth a flow chart illustrating another example of a method for adaptable receiver detection according to embodiments of the present invention.

The method of FIG. 8 is similar to the method of FIG. 3 in that the method of FIG. 8 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

In the method of FIG. 8, however, determining (308) whether the rise time (350) and the fall time (352) are consistent with the transmitter (301) being coupled through the communication link (392) to a remote receiver (390) includes determining (802) that the rise time (350) and the fall time (352) do not correspond to times (851) associated with a predefined range (850) of receiver impedance. Determining (802) that the rise time (350) and the fall time (352) do not correspond to times (851) associated with a predefined range (850) of receiver impedance may be carried out by determining that the fall time is over a particular time, under a particular time, within a particular range of times, or some combination thereof, and determining that the rise time is over a particular time, under a particular time, within a particular range of times, or some combination thereof. In a particular embodiment, the receiver detection circuitry (300) includes a plurality of ranges of receiver impedances.

In the method of FIG. 8, however, determining (308) whether the rise time (350) and the fall time (352) are consistent with the transmitter (301) being coupled through the communication link (392) to a remote receiver (390) includes determining (804) that changing a variable output resistance (852) of a receiver detection driver (490) does not correspond the rise time (350) and the fall time (352) to the times (851) associated with the predefined range (850) of receiver impedance. Determining (804) that changing a variable output resistance (852) of a receiver detection driver (490) does correspond the rise time (350) and the fall time (352) to the times (851) associated with the predefined range (850) of receiver impedance may be carried out by changing the strength of the receiver detection driver; generating new rise times and fall times; and comparing the new rise times and fall times to the times associated a voltage change corresponding to a particular range of receiver impedance.

In the method of FIG. 8, however, determining (308) whether the rise time (350) and the fall time (352) are consistent with the transmitter (301) being coupled through the communication link (392) to a remote receiver (390) includes attributing (806) a soft fail to the communication link (392) in response to determining that changing a variable output resistance (852) of a receiver detection driver (490) does correspond the rise time (350) and the fall time (352) to the times (851) associated with the predefined range (850) of receiver impedance. A soft fail occurs if a receiver detection driver can change a voltage change rate but the rate does not correspond to rates associated with an expected range of receiver impedance or coupling capacitor. Based on a soft fail indication, a user may choose to use degraded link on less stringent channels on a lower data rate. The user may also program a receiver detection reference value level, timer values, and driver strength according to their communication channel characteristics. Attributing (806) a soft fail to the communication link (392) in response to determining that changing a variable output resistance (852) of a receiver detection driver (490) does correspond the rise time (350) and the fall time (352) to the times (851) associated with the predefined range (850) of receiver impedance may be carried out by storing, displaying, or providing a flag or some other type of indicator that is associated with a soft fail assignment.

In a particular embodiment, the receiver detection circuitry (300) includes a plurality of ranges of receiver impedances and the receiver detection driver may determine that the rise time (350) and the fall time (352) do not correspond to a first set of times associated with a first range of receiver impedances. In response to determining that that the rise time (350) and the fall time (352) do not correspond to a first set of times associated with a first range of receiver impedances, the receiver detection circuitry (300) may determine that the rise time (350) and the fall time (352) do correspond to a second set of times associated with a second range of receiver impedances. In this particular embodiment, the receiver detection circuitry may attribute a soft fail to the communication link in response to determining that the rise time (350) and the fall time (352) do not correspond to a first set of times but do correspond to a second set of times.

Figure 9:
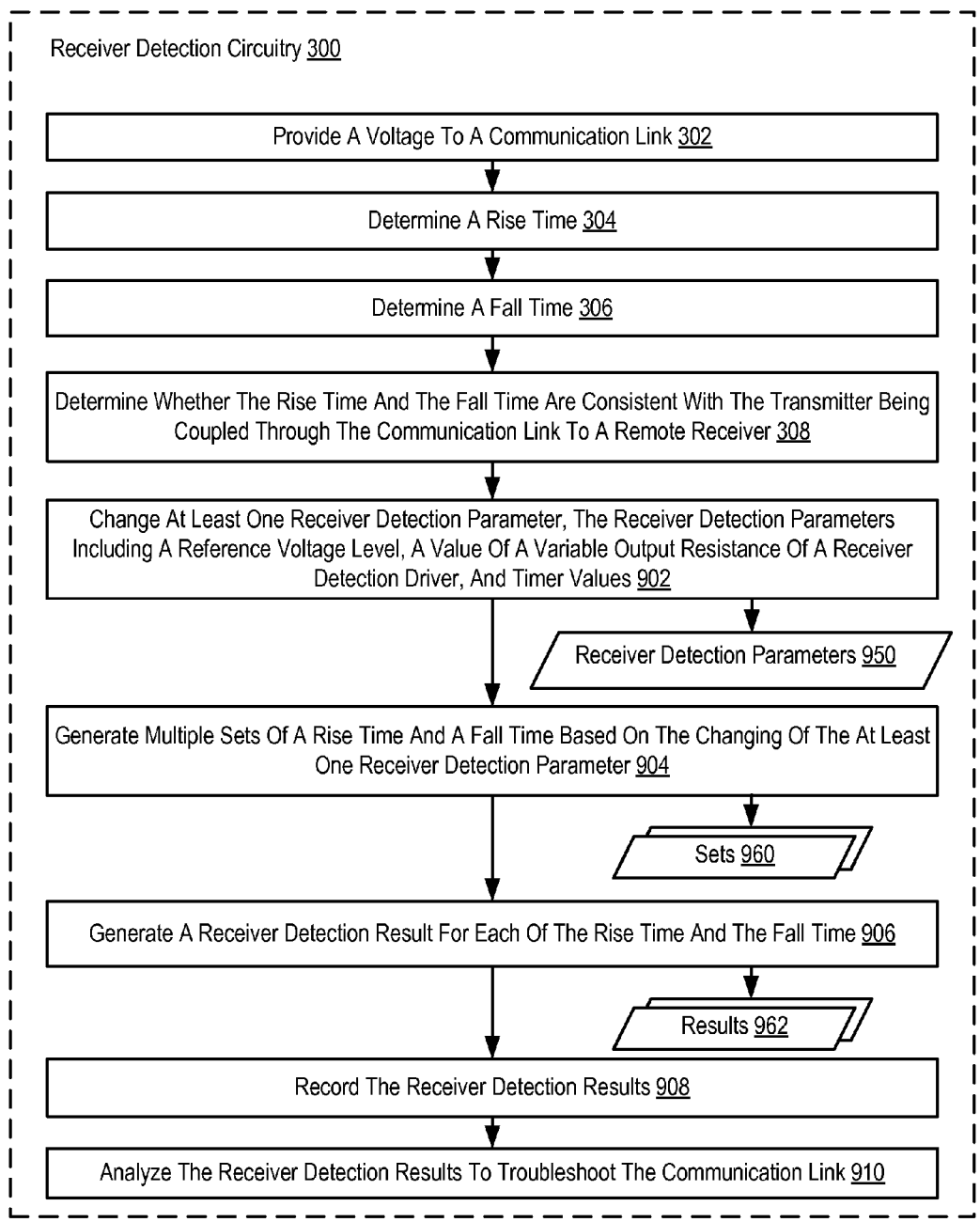
FIG. 9 sets forth a flow chart illustrating another example of a method for adaptable receiver detection according to embodiments of the present invention.

FIG. 9 sets forth a flow chart illustrating another example of a method for adaptable receiver detection according to embodiments of the present invention. The method of FIG. 9 is similar to the method of FIG. 3 in that the method of FIG. 9 also includes providing (302) a voltage to the communication link (392); determining (304) a rise time (350) corresponding to a rising edge change of the voltage on the communication link (392); determining (306) a fall time (352) corresponding to a falling edge change of the voltage on the communication link (392); and determining (308) whether the rise time (350) and the fall time (352) are consistent with the transmitter (301) being coupled through the communication link (392) to a remote receiver (390).

The method of FIG. 9 includes changing (902) at least one receiver detection parameter (950). Examples of receiver detection parameters include a reference voltage level, a value of a variable output resistance of a receiver detection driver, and timer values. Changing (902) at least one receiver detection parameter (950) may be carried out by changing a reference voltage level, a value of a variable output resistance of a receiver detection driver, and changing one or more timer values of a timing driven decision circuit.

The method of FIG. 9 also includes generating (904) multiple sets (960) of a rise time and a fall time based the changing of the at least one receiver detection parameter (950). Generating (904) multiple sets (960) of a rise time and a fall time based the changing of the at least one receiver detection parameter (950) may be carried out by looping through the receiver detection function using different receiver detection parameters.

The method of FIG. 9 also includes generating (906) a receiver detection result (962) for each set (960) of the rise time and the fall time. Generating (906) a receiver detection result (962) for each set (960) of the rise time and the fall time may be carried out by generating a detection result output from a timing driven decision circuit; and storing the detection result output.

Exemplary embodiments of the present invention are described largely in the context of a fully functional computer system for adaptable receiver detection. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of adaptable receiver detection, the method comprising:
   providing, by receiver detection circuitry at a transmitter coupled to a communication link, a voltage to the communication link;
   driving, by a receiver detection driver having a variable output resistance, the rising edge change of the voltage on the communication link and the falling edge change of the voltage on the communication link;
   determining, by the receiver detection circuitry, a rise time corresponding to a rising edge change of the voltage on the communication link;
   determining, by the receiver detection circuitry, a fall time corresponding to a falling edge change of the voltage on the communication link; and
   determining, by the receiver detection circuitry, whether the rise time and the fall time are consistent with the transmitter being coupled through the communication link to a remote receiver.

2. The method of claim 1 further comprising:
   changing the variable output resistance of the receiver detection driver;
   using the changed variable output resistance to determine another rise time and another fall time; and
   determining, by the receiver detection circuitry, whether the other rise time and the other fall time are consistent with the transmitter being coupled through the communication link to the remote receiver.

3. The method of claim 1 wherein determining, by the receiver detection circuitry, a rise time corresponding to a rising edge change of the voltage on the communication link includes: measuring a level of the voltage on the communication link and determining an amount of time for the measured level of the voltage to rise above a first threshold corresponding to a reference voltage level; and
   wherein determining, by the receiver detection circuitry, a fall time corresponding to a falling edge change of the voltage on the communication link includes: determining an amount of time for the measured level of the voltage to fall below a second threshold corresponding to the reference voltage level.

4. The method of claim 3 further comprising:
   selecting a new reference voltage level;
   determining another rise time and another fall time corresponding to the selected new reference voltage level; and
   determining, by the receiver detection circuitry, whether the other rise time and the other fall time are consistent with the transmitter being coupled through the communication link to the remote receiver.

5. The method of claim 1 wherein determining, by the receiver detection circuitry, whether the rise time and the fall time are consistent with the transmitter being coupled through the communication link to a remote receiver includes:
   comparing the rise time to first timer values; and
   comparing the fall time to second timer values, each timer value indicating a length of time for a voltage change corresponding to a receiver impedance.

6. The method of claim 1 wherein determining, by the receiver detection circuitry, whether the rise time and the fall time are consistent with the transmitter being coupled through the communication link to a remote receiver includes:

determining that the change in the voltage on the communication link has a fixed relationship to changes to a reference voltage level and that the fixed relationship is unaltered by changes to a variable output resistance of a receiver detection driver coupled to the communication link; and attributing a hard fail to the communication link in response to determining that the change in the voltage on the communication link has a fixed relationship to changes to a reference voltage level and that the fixed relationship is unaltered by changes to a variable output resistance of a receiver detection driver coupled to the communication link.

7. The method of claim 1 wherein determining, by the receiver detection circuitry, whether the rise time and the fall time are consistent with the transmitter being coupled through the communication link to a remote receiver includes:

determining that the rise time and the fall time do not correspond to times associated with a predefined range of receiver impedance;

determining that changing a variable output resistance of a receiver detection driver does not correspond the rise time and the fall time to the times associated with the predefined range of receiver impedance; and attributing a soft fail to the communication link in response to determining that changing a variable output resistance of a receiver detection driver does not correspond the rise time and the fall time to the times associated with the predefined range of receiver impedance.

8. The method of claim 1 further comprising:

changing at least one receiver detection parameter, the receiver detection parameters including a reference voltage level, a value of a variable output resistance of a receiver detection driver, and timer values;

generating multiple sets of a rise time and a fall time based the changing of the at least one receiver detection parameter; and generating a receiver detection result for each set of the rise time and the fall time.

9. The method of claim 8 further comprising:

recording the receiver detection results; and analyzing the receiver detection results to troubleshoot the communication link.

10. An apparatus for adaptable receiver detection, the apparatus comprising receiver detection circuitry at a transmitter coupled to a communication link, the receiver detection circuitry configured to:

provide a voltage to the communication link;

drive, by a receiver detection driver having a variable output resistance, the rising edge change of the voltage on the communication link and the falling edge change of the voltage on the communication link;

determine a rise time corresponding to a rising edge change of the voltage on the communication link;

determine a fall time corresponding to a falling edge change of the voltage on the communication link; and determine whether the rise time and the fall time are consistent with the transmitter being coupled through the communication link to a remote receiver.

11. The apparatus of claim 10 wherein the receiver detection driver is configured to change the variable output resistance of the receiver detection driver; and wherein the receiver detection circuitry is configured to:

use the changed variable output resistance to determine another rise time and another fall time; and determine whether the other rise time and the other fall time are consistent with the transmitter being coupled through the communication link to the remote receiver.

12. The apparatus of claim 10 wherein determining a rise time corresponding to a rising edge change of the volage on the communication link includes:

measuring a level of the volage on the communication link and determining an amount of time for the measured level of the voltage to rise above a first threshold corresponding to a reference voltage level; and wherein determining a fall time corresponding to a falling edge change of the voltage on the communication link includes: measuring a level of the voltage on the communication link and determining an amount of time for the measured level of the voltage to fall below a second threshold corresponding to the reference voltage level.

13. The apparatus of claim 12 wherein the receiver detection circuitry is configured to:

select a new reference voltage level;

determine another rise time and another fall time corresponding to the selected new reference voltage level; and determine whether the other rise time and the other fall time are consistent with the transmitter being coupled through the communication link to the remote receiver.

14. The apparatus of claim 10 wherein determining, by the receiver detection circuitry, whether the rise time and the fall time are consistent with the transmitter being coupled through the communication link to a remote receiver includes:

comparing the rise time to first timer values; and comparing the fall time to second timer values, each timer value indicating a length of time for a voltage change corresponding to a receiver impedance.

15. The apparatus of claim 10 wherein determining, by the receiver detection circuitry, whether the rise time and the fall time are consistent with the transmitter being coupled through the communication link to a remote receiver includes:

determining that the change in the voltage on the communication link has a fixed relationship to changes to a reference voltage level and that the fixed relationship is unaltered by changes to a variable output resistance of a receiver detection driver coupled to the communication link; and attributing a hard fail to the communication link in response to determining that the change in the voltage on the communication link has a fixed relationship to changes to a reference voltage level and that the fixed relationship is unaltered by changes to a variable output resistance of a receiver detection driver coupled to the communication link.

16. The apparatus of claim 10 wherein determining, by the receiver detection circuitry, whether the rise time and the fall time are consistent with the transmitter being coupled through the communication link to a remote receiver includes:

determining that the rise time and the fall time do not correspond to times associated with a predefined range of receiver impedance;

determining that changing a variable output resistance of a receiver detection driver does not correspond the rise time and the fall time to the times associated with the predefined range of receiver impedance; and attributing a soft fail to the communication link in response to determining that changing a variable output resistance of a receiver detection driver does not correspond the rise time and the fall time to the times associated with the predefined range of receiver impedance.

17. The apparatus of claim 10 wherein the receiver detection circuitry is configured to:
change at least one receiver detection parameter, the receiver detection parameters including a reference voltage level, a value of a variable output resistance of a receiver detection driver, and timer values;
generate multiple sets of a rise time and a fall time based the changing of the at least one receiver detection parameter; and
generate a receiver detection result for each set of the rise time and the fall time.

18. The apparatus of claim 17 wherein the receiver detection circuitry is further configured to:
record the receiver detection results; and
analyze the receiver detection results to troubleshoot the communication link.

\* \* \* \* \*